United States Patent

Anglade

[11] 3,983,909
[45] Oct. 5, 1976

[54] THREE-WAY SOLENOID VALVE

[75] Inventor: Etienne Anglade, Paris, France

[73] Assignee: Societe Anonyme D.B.A., Paris, France

[22] Filed: Feb. 18, 1976

[21] Appl. No.: 659,066

Related U.S. Application Data

[63] Continuation of Ser. No. 534,242, Dec. 19, 1974, abandoned.

[30] Foreign Application Priority Data

Dec. 14, 1973 France .............................. 73.44697

[52] U.S. Cl. ......................... 137/625.65; 137/625.5; 251/84
[51] Int. Cl.² .......................................... F16K 11/04
[58] Field of Search ................... 137/625.5, 625.65; 251/84, 139

[56] References Cited
UNITED STATES PATENTS 3,542,333  11/1970  Stampfli .......................... 251/139 X
3,661,183  5/1972  Komaroff et al. ............... 137/625.65

*Primary Examiner*—Alan Cohan
*Assistant Examiner*—Gerald A. Michalsky
*Attorney, Agent, or Firm*—Ken C. Decker; William N. Antonis

[57] ABSTRACT

A three way solenoid valve comprising a housing which contains a cylindrical cavity around which an electric coil is disposed. Two seats extend perpendicularly relative to the cavity axis and are arranged opposite one another. The seats communicate respectively with an inlet orifice and an outlet orifice. A work orifice communicates with the cavity. A core of ferromagnetic material is mounted with axial clearance in the cavity and two valve closure members are mounted in the core and capable of cooperating with the seats in accordance with the reciprocations of the core. A return spring urges the core with a position in which one of the valve seats is closed.

1 Claim, 1 Drawing Figure

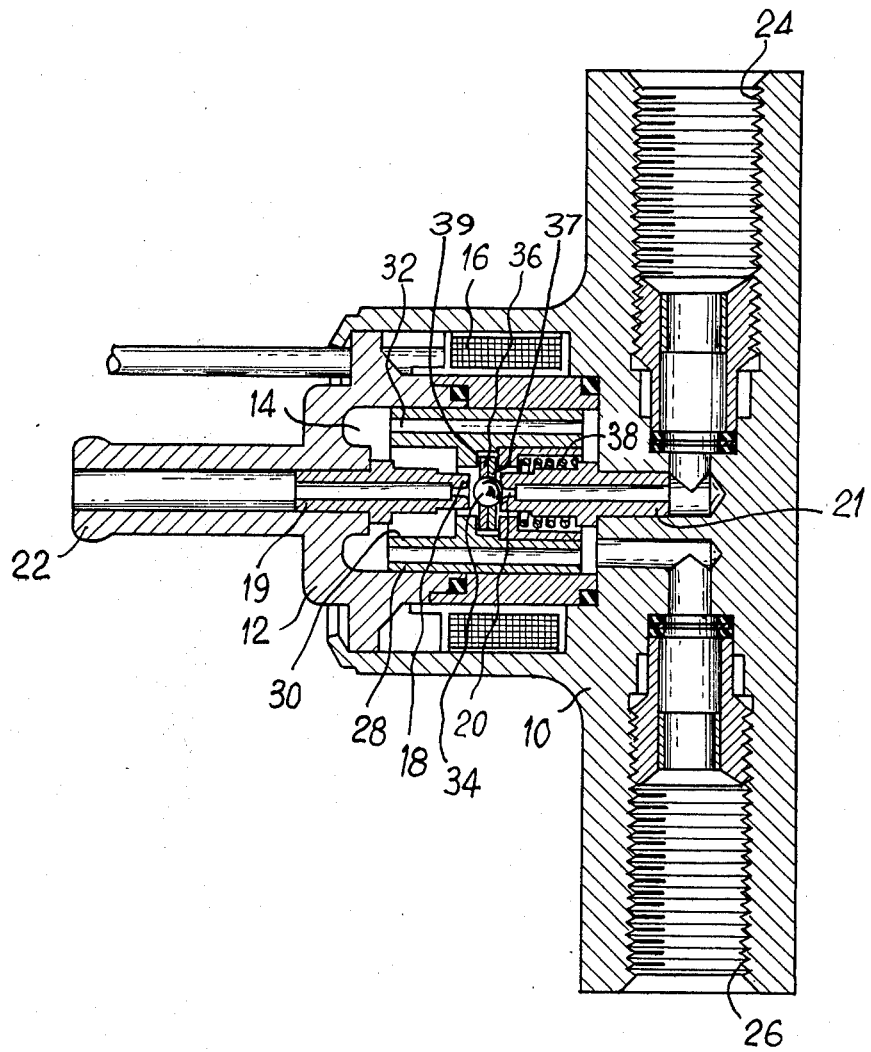

THREE-WAY SOLENOID VALVE

This is a continuation of application Ser. No. 534,242, filed Dec. 19, 1974, now abandoned.

The invention relates to a three-way solenoid valve, more particularly for use in an anti-skid brake circuit for a motor vehicle. A solenoid valve of this type can be connected to a pressure fluid source, to a low-pressure reservoir of the atmosphere, and to a set of brake actuators in the vehicle.

Known three-way solenoid valves have a soft-iron core connected by a rod to a dual valve closure member capable of co-operating in a fluid tight manner with two seats situated on opposite sides of the dual closure member. With this arrangement the rod must pass through one of the seats, which must therefore have a reduced diameter. An object of the invention is to propose a novel design enabling the three-way solenoid valve to be as compact as possible.

According to the invention, the three-way solenoid valve comprises a housing containing a cylindrical cavity around which an electric coil is disposed, two seats extending perpendicularly relative to the cavity axis and being arranged opposite one another, the seats communicating respectively with an inlet orifice and an outlet orifice, a work orifice communicating with the cavity, a core of ferromagnetic material mounted with axial clearance in the cavity, two valve closure members mounted in the core and capable of co-operating in a fluid-tight manner with the seats in accordance with the reciprocations of the core in the cavity, and a return spring urging the core into a position in which one of the valve seats is closed.

A solenoid valve embodying the invention has various advantages. It is more compact because the valve closure members are sited in the core and because there are no rods passing through the valve seats. The valve seat diameters can therefore be smaller, so that less hydraulic force is required. The magnetic circuit and the electrical power needed are therefore also reduced. Lastly, the reduction in the hydraulic force and in the inertia of the moving parts improves the recovery time of the solenoid valve and the performance of the system incorporating it.

In a preferred embodiment of the invention, the valve closure members are mounted with slight radial clearance in a central bore in the core. This permits self-centering of the closure member on its seat when it co-operates with the latter, ensuring a good seal.

The invention will now be described, by way of example with reference to the sole FIGURE of the accompanying drawings.

The three-way solenoid valve, which is shown in its energised position, has a housing in two parts 10, 12 crimped on to one another. The two parts are recessed so as to define therein a cylindrical cavity 14 and a recess capable of housing a coil 16, coaxial with and arranged round the cavity 14. Two seats 18, 20 are situated on two spigots 19, 21 mounted in the ends of the cavity 14; they extend perpendicularly to the cavity axis and are arranged opposite one another. The seats 18, 20 communicate with an outlet orifice 22 and an inlet orifice 24 respectively. The cavity 14 is also permanently connected to a third orifice 26, termed the work orifice. A cylindrical core 28 of ferromagnetic material is slidable with axial clearance in the cavity. The core 28 contains longitudinal ducts 32 and a central bore 30, which is coaxial with the cavity 14 and into which the ends of the spigots 19, 21 project. The valve closure members, which are formed by opposite sides of a single component 34 forming a body of revolution, are mounted with slight radial clearance in the central portion of the bore 30. The axis of revolution of the component 34 is parallel to the axis of the cavity. In the embodiment illustrated, the component 34 is a ball. Two washers 36, 37 carry the ball 34. The peripheral edges of the washers 36, 37 are installed in a groove 39 defined on the wall of the bore. The diameter of the groove 39 is greater than the diameter of the washers 36, 37, so that limited radial movement of the washers, and the ball 34 carried by the washers, is permitted. The walls of the groove cooperate with the sides of the washers to restrain axial movement of the washers with respect to the bore. The limited radial movement of the washers permits the ball 34 to center itself on the seat with which it is cooperating. The seats are bevelled to improve fluid-tightness during this co-operation.

A return coil spring 38 housed in the central bore urges the core to the left in the FIGURE, so that the ball co-operates with the seat 18 in a fluid-tight manner when the valve coil is not energised. Without exceeding the scope of the invention, a cup spring may be substituted for the coil spring. When the valve coil 16 is energised, the core is urged to the right in the FIGURE, so that the ball 34 co-operates in a fluid-tight manner with the seat 20.

What we claim is:

1. A three-way solenoid valve comprising a housing defining a cavity therewithin, an electric coil disposed around said cavity, a pair of axially spaced valve seats carried by said housing within said cavity, said housing including an inlet orifice communicating with one of said valve seats, an outlet orifice communicating with the other of said valve seats, a work orifice communicating with said cavity, a core of ferromagnetic material slidably mounted within said cavity, said core defining a bore therewithin, a ball valve member carried by said core in said bore, said ball valve member cooperating with said valve seats to control fluid communication between said orifices, means mounting said ball valve member in said bore, said mounting means including a groove in the wal of said bore, a pair of axially spaced washers, the peripheral edges of said washers extending into said groove, the diameter of said groove being greater than the diameter of said washers whereby said groove permits limited radial movement of the washers with respect to said bore, the walls of the groove cooperating with the sides of the washers to restrain axial movement of the washers with respect to the bore, said ball valve member being carried by said washers, whereby the limited radial movement of said washers carrying said ball valve member permits the latter to center itself on said seats when urged thereagainst, the resilient means yieldably urging said ball valve member into engagement with one of said seats, said ball valve member moving with the core to engage the other of said seats upon energization of said coil.

* * * * *